United States Patent [19]
Horn et al.

[11] Patent Number: 5,351,558
[45] Date of Patent: Oct. 4, 1994

[54] DEVICE FOR MEASURING BULK FLOW

[75] Inventors: Klaus Horn, Braunschweig; Horst Weigelt, Gütersloh; Stefan Böttinger, Steinhagen, all of Fed. Rep. of Germany

[73] Assignee: Claas oHG, Harsewinkel, Fed. Rep. of Germany

[21] Appl. No.: 836,477

[22] Filed: Feb. 18, 1992

[30] Foreign Application Priority Data

Feb. 25, 1991 [DE] Fed. Rep. of Germany ....... 4105857

[51] Int. Cl.$^5$ .............................................. G01F 23/00
[52] U.S. Cl. .................................. 73/861.08; 73/861
[58] Field of Search ............... 324/686, 688, 663, 665; 73/861, 861.08

[56] References Cited

U.S. PATENT DOCUMENTS

| | | | |
|---|---|---|---|
| 3,393,799 | 7/1968 | Schmersal | 324/688 |
| 3,467,860 | 9/1969 | Trischberger . | |
| 3,498,128 | 3/1970 | Calvet . | |
| 3,706,980 | 12/1972 | Maltby | 324/688 |
| 3,777,258 | 12/1973 | Wochnowski . | |
| 3,781,672 | 12/1973 | Maltby et al. | 324/688 |
| 4,499,111 | 2/1985 | Oetiker et al. | 324/665 |
| 4,509,366 | 4/1985 | Matsushita et al. . | |
| 4,538,453 | 9/1985 | Simmons | 73/73 |
| 4,547,725 | 10/1985 | Oetiker et al. | 324/665 |
| 4,580,233 | 4/1986 | Parker et al. | 364/550 |
| 4,736,156 | 4/1988 | Benson et al. | 324/668 |
| 4,845,421 | 7/1989 | Howarth et al. | 324/688 |
| 4,932,243 | 6/1990 | Shuh et al. . | |

FOREIGN PATENT DOCUMENTS

| | | |
|---|---|---|
| 636316 | 9/1936 | Fed. Rep. of Germany . |
| 861933 | 1/1953 | Fed. Rep. of Germany . |
| 1121378 | 1/1962 | Fed. Rep. of Germany . |
| 1130206 | 5/1962 | Fed. Rep. of Germany . |
| 1573094 | 10/1970 | Fed. Rep. of Germany . |
| 1942773 | 7/1973 | Fed. Rep. of Germany . |
| 3302736 | 8/1984 | Fed. Rep. of Germany . |
| 3532570 | 5/1986 | Fed. Rep. of Germany . |
| 4025952 | 7/1991 | Fed. Rep. of Germany . |

OTHER PUBLICATIONS

R. G. Green et al. –"A Low–cost Solids Flowmeter for Industrial Use". J. Phys. E: Sci Instr. vol. 11, pp. 1005–1010, Mar. 13, 1978.

R. Kautsch–"Der Kapazitive Geber und seine Anwendung in der Feinmesstechnik". Funk–Technik Nr. May 1962, pp. 137–140.

*Primary Examiner*—Richard E. Chilcot, Jr.
*Assistant Examiner*—R. Biegel
*Attorney, Agent, or Firm*—Browdy and Neimark

[57] ABSTRACT

A measuring device with a measuring capacitor (C1), through which a bulk flow (KS) is conducted in the form of a layered dielectric. The capacitance measurement signal of the measuring capacitor (C1) is supplied via a signal evaluation circuit (M1) and an analog-digital converter (ADU) to an evaluation processor (MP) and there is calculated together with a velocity signal (Sv) to form a bulk flow value, which is supplied to a display (A). A reference capacitance signal is obtained at a filled second measuring capacitor (C2). The device is suitable in connection with harvesters.

18 Claims, 8 Drawing Sheets

DEVICE FOR MEASURING BULK FLOW

BACKGROUND OF THE INVENTION

The invention relates to a device for measuring a bulk flow of objects having dielectric constants which are different from those of their surroundings, in particular of bulk material, where the bulk flow is conducted through a measuring capacitor the capacitance of which is continuously measured.

A device is known from German Patent Disclosure DE 21 06 970 A1, by means of which a plurality of bulk flows of a crop, namely cereal grain, is conducted quasi-continuously through associated capacitors, the capacitances of which are continuously measured and brought into a ratio in respect to each other in such a way that the capacity ratio formed in this way constitutes a relative, quantitative measurement of the ratio of the two grain flows to each other. In this case the grain falls in a loose undefined spatial distribution through the capacitors. For this reason the respective capacitance value only represents a qualitative measurement, not a reproducible quantitative measurement of the grain flow, because the measured objects have a different effect on each other in relation to the field and thus in respect to the measuring signals, depending on their relative positions in the electrical measuring field. Furthermore, this device is not suited to produce absolute measured values in regard to the bulk flows, because their capacitive field effect is strongly dependent on the material properties, such as moisture, the relative dielectric constant, the electrical conductance and particularly the density of the material to be measured. In addition, the capacitors of the known device have strongly nonhomogenous field distributions, which entails further measuring inaccuracies.

Furthermore, a device is known from German Published, Non-Examined Patent Application DE OS 19 42 773, where a flow of cereal grain is dammed up in a partial area of a capacitor and is capacitor measuring chamber. The height of damming was determined from the capacity of the capacitor and thus the dammed volume, from which, together with frequency of emptying, a grain volume flow was calculated. This device is only suitable for comparatively slow moving grain flows, and a bulky bucket wheel or a mechanically operated discharge chute, which causes inaccuracies during the time of emptying, is required for emptying.

Furthermore, a bulk flow meter for high flow rates is known from European Patent Disclosure EP 0 208 025 A1, where a bulk flow transported by means of an elevator is deflected in a bend of the conduit on which a continuously operating weighing device is disposed, which measures the force generated by the curved deflection at the conduit bend, which constitutes a measurement for the bulk flow. However, the measuring accuracy depends on the one hand on the exact maintenance of the conveying velocity and on the other on the coefficient of friction of the conduit bend in regard to the respective grain. Because this coefficient depends to a large degree on the moistness and ripeness and since conveying takes place quasi-continuously by means of a mechanical scoop, only a reduced measuring accuracy can be achieved.

SUMMARY OF THE INVENTION

It is the object of the invention to improve the above described device for capacitive measuring of a bulk flow, in particular of grain flows, in such a way that it is suitable for high flow rates and provides great accuracy and absolute measured values together with relative simple construction.

This object is attained in that the bulk flow is conducted through the measuring capacitor in such a way that it forms a layered dielectric with an approximately homogenous velocity distribution. In an advantageous embodiment the bulk flow is conducted through a first measuring capacitor in such a way that it forms a distribution, and is conducted through a second measuring capacitor in such a way that the latter has a greater bulk inflow than bulk outflow so that it is always completely filled and there is an overflow. The two capacitances of the measuring capacitors are determined with the same measuring device to form a capacity ratio. Continuous measurement of absolute values of a grain flow in harvesting machinery results in considerable advantages when using the measured value for the control and monitoring of the operation of the machine, in particular of the forward velocity, of the sifter drives and the cutting height, and it permits the establishment of harvest records which will be the basis for systematic working of the soil and fertilizing adapted to the respective soil and harvest values and extending over years.

The novel principle in accordance with which the device operates, namely that the two media with different dielectric constants, such as the air and the grain flow, are conducted through the measuring capacitor as far apart from each other as possible, but in layers, is based on the recognition that only in this way a definite connection between the quantitative ratios of the two media in the capacitor field and the capacitance is given. Thus the device is suitable not only for the measurement of flows of flowable solid products of the most varied types in a gaseous or liquid medium, but also for the measurement of the distribution of a dispersion of gas bubbles or drops of liquid in a liquid with a different dielectric constant.

The layering in the capacitor area necessary for measuring the quantitative ratios of the different media takes place either simply by the action of gravity along an extended inclined chute section or additionally by means of the force of inertia of the bulk particles in the course of a directional deflection of the bulk flow. By means of this it is possible to keep the required blending of the flow, so that it attains an extensive homogenous velocity distribution over its cross section, which is one of the prerequisites for useful measurement.

An advantageous embodiment of the measuring device in connection with a harvester consists in that a path deflector is disposed downstream of the grain elevator, for example the mechanical scoop, in which blending of the grain takes place which is then discharged onto different radial paths and thus has different velocities, and where densification of the grain flow and homogenization of the velocity is caused by the centrifugal force occurring at the curved wall. The smooth guide path and the homogenized grain flow prevent damage to the delicate harvest product. The grain flow is carried from the measuring section to a silo essentially without braking; only a partial flow is conducted through a comparison capacitor measuring chamber which is continually emptied and is always maintained filled to overflow.

Various circuit arrangements are suitable for the capacitance comparison measurement, where advantageously always the same measuring device is used for measuring both capacitances, so that systemic errors are compensated to a large extent.

A first measuring device is characterized by a carrier frequency measuring bridge, the input of which is alternately switched to the two capacitances to be measured. The associated measured results are compared with each other in a computer.

Another simplified measuring device consists in switching the two capacitances to be compared in the form of bridge members into a carrier frequency bridge, so that the bridge output signal becomes a measurement for the determination of the capacity ratios.

A further very simple type of the measurement of capacity ratios is used in a circuit in which a capacitive charge of the capacitances up to a comparison voltage by means of a current source is alternately provided, wherein the respectively required charge times of the two measuring capacitors are measured and are subsequently compared.

A particularly rapid and accurate measurement is provided by a further circuit arrangement where the two capacitances to be compared are disposed in the arms of a bridge circuit. In this case there is an immediate formation of a ratio, which then must be reduced to the capacity ratio by means of the known functional interrelation of the bridge circuit, which can take place by a simple equation calculation or access to a table. This functional transformation can be combined with the functional linkage, required anyway, of the capacitive ratio with the function of the layered dielectric, so that in any case only a common processing of a measurement result by means of accessing a table or by a functional calculation is required.

In an advantageous embodiment of a bridge measuring circuit containing both measuring capacitors in a measuring arm, the former is supplied with an alternating bridge voltage which changes polarity just at the time when either an upper or lower preset tolerance point of the bridge alignment has been achieved. The respective times of the two switched polarities are measured and are then placed into a ratio which produces the bridge ratio.

In order to attain as accurate as possible a measurement result, one of the measuring electrodes of each measuring capacitor is surrounded by a protective electrode which electronically follows up the potential of the measuring electrode. It is assured by means of a suitable embodiment of the protective electrode in a known manner that there is an approximately parallel path of the force lines in the measuring height of the layers of the dielectric to be measured and the capacitance. This definite ratio is used for the conversion of the respective originally obtained ratio value.

BRIEF DESCRIPTION OF THE DRAWINGS

Advantageous embodiments are illustrated by means of FIGS. 1 to 8.

DETAILED DESCRIPTION OF THE PREFERRED EMBODIMENTS

Figure 1:
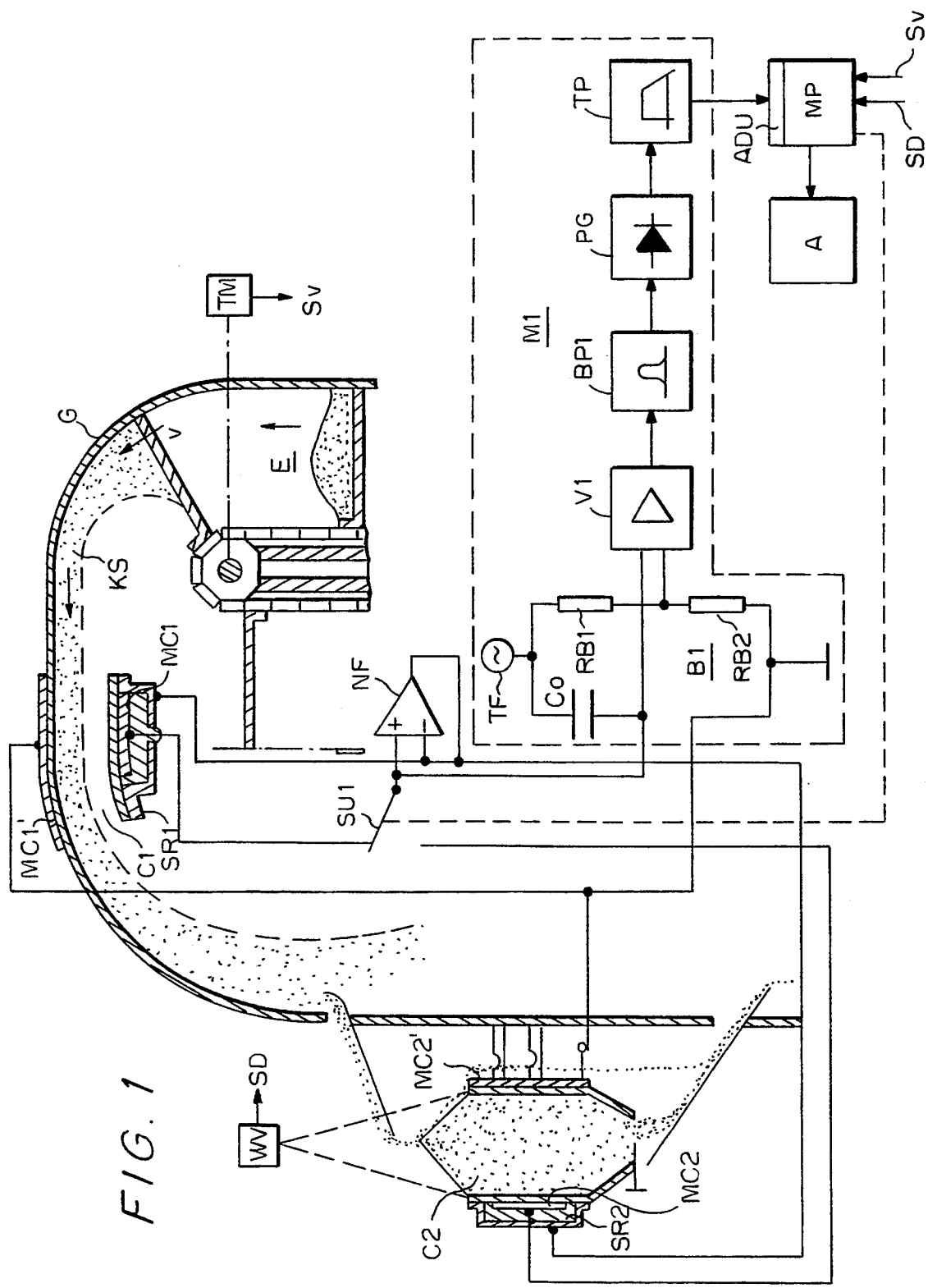
FIG. 1 shows a portion of a vertical sectional view of a measuring capacitor device with a first measuring circuit.

FIG. 1 shows the upper part of a grain elevator (E), the housing (G) of which causes the deflection of the grain flow (KS) ejected from the end into a first measuring capacitor (C1), so that the grain flow (KS) forms a layered dielectric crosswise to the path of the lines of force in it. The capacitor (C1) is surrounded by a protective ring electrode (SR1), which has the same potential as the measuring covering (MC1). The backplate electrode (MC1') may be disposed insulated or grounded, depending on the connected measuring device.

A second measuring capacitor (C2) is disposed at the side of the stream in the grain flow and has a bottom opening small enough so that in continuous operation it is always filled to overflow with grain. The measuring electrode (MC2) of this capacitor (C2) is also surrounded by a protective ring electrode (SR2). The reference electrode (MC2') is electrically connected with the protective ring electrodes (SR1, SR2) are electrically connected with each other so that only one impedance transformer is necessary as a potential tracking amplifier (NF).

A tachometer (TM) is disposed on the drive of the elevator (E), which provides a measuring signal (Sv) of the average grain flow velocity (v).

A first capacitance measuring device (M1) is alternately connected via a controllable reversing switch (SU1) with the measuring electrodes (MC1, MC2) of the two measuring capacitors (C1, C2), which are respectively located in an arm of a bridge circuit (B1), in the other arms of which a standard capacitor (Co) and two bridge resistors (RB1, RB2) are located. The bridge (B1) is supplied by a carrier frequency oscillator (TF) and has an amplifier (V1) in the other diagonal, the output signal of which passes sequentially through a bandpass filter (BP1), a phase-selective rectifier (PG) and then a low pass filter (TP), whose output signal, which represents the bridge measuring signal of the one or the other measuring capacitance, depending on the reversing switch position, is supplied to an evaluation processor (MP) which digitally converts this signal in an analog-digital converter (ADU) in temporal association with the reversing switch positions. The capacitance bridge measuring values obtained in this manner are then converted in accordance with bridge functions and are brought into a ratio in a program. This is transformed into the functional linkage in accordance with the capacitance course of a layered dielectric, so that the relative bulk ratio in the two measuring capacitors is the result. This bulk ratio is multiplied with the respective value of the velocity signal (Sv) and a preset specific density value (SD), which results in the bulk flow value (MSW), which is supplied to a display device (A) directly or via an integrator (I).

The signal (Sv) of the velocity sensor corresponds to an average velocity of the grain which, during the transition of the elevator scoops from the lifting movement to the rotary movement, increases with the distance from the turning axis. Because the grains are propelled outward by centrifugal force they interact by pushing in such a way that they assume an average velocity (v) with little spread.

Because the functions of layering and homogenizing of the grain flow are only assured within a certain velocity range, the evaluation processor (MP) monitors the keeping of this permissible velocity range by means of periodic comparison of the velocity signal value (Sv) with an upper and lower threshold value and sounds an alarm if this is exceeded in either direction.

The density value (SD) which, among others, depends on the moisture, can be determined from time to time and entered into the evaluation processor (MP), or it is continuously determined gravimetrically by means of a weighing cell and is continuously provided to the processor (MP). For example, the measuring capacitor (C2) is suitable as a measuring cell if it is disposed in a weighing device (WV). An average value of the weighing signal is formed at such intervals that variations, which occur because of jarring during the travel of the harvester, are smoothed out.

Figure 2:
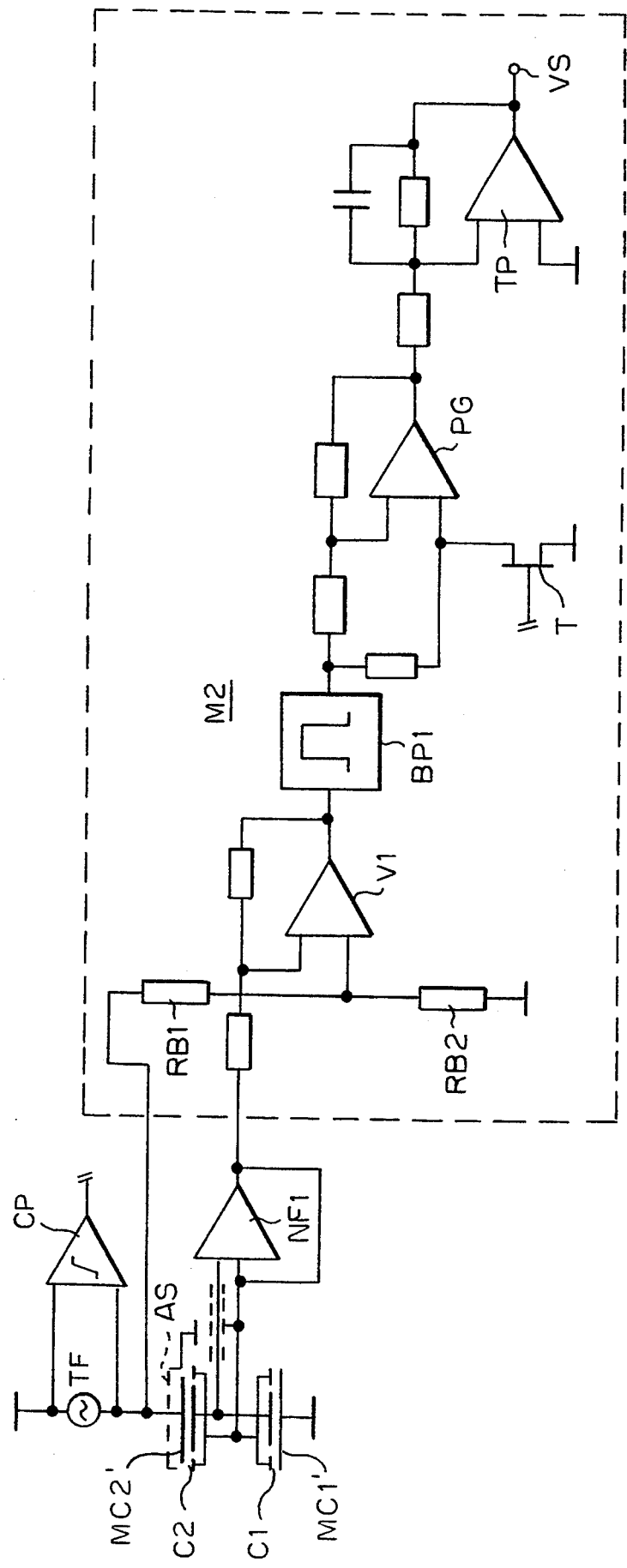
FIG. 2 shows a further measuring circuit in which the measuring capacitors have been placed in a bridge arm.

FIG. 2 shows a particular embodiment of a measuring circuit (M2), where a reversing switch is omitted and the two capacitors (C1, C2) which are to be brought in a ratio to each other are disposed in two adjacent arms of the bridge. The reference electrode (MC1') of the first measuring capacitor (C1) is connected to the ground potential, so that the elevator wall is used as an electrode. The reference electrode (MC2') of the other capacitor (C2) is connected with the carrier frequency generator (TF); this electrode (MC2') is surrounded with a shielding (AS) ground.

Figure 3:
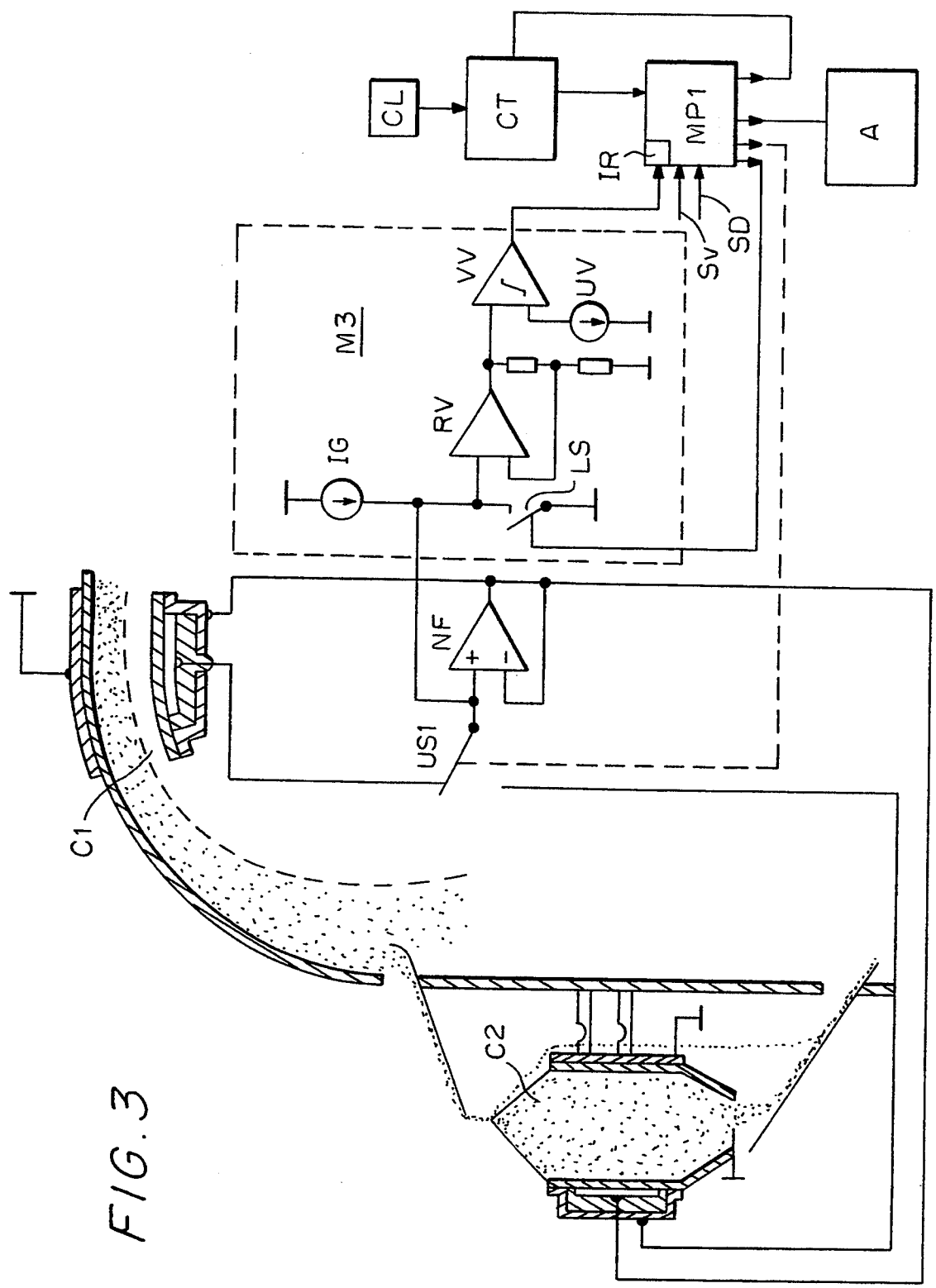
FIG. 3 shows a third measuring circuit with a ramp integrator and a digitizing counter.

The two measuring electrodes of the measuring capacitors (C1, C2) are connected with the input of the impedance converter (NF1), which supplies the protective rings and the supply shielding. From the output of the impedance converter (NF1), the signal is conducted to the bridge amplifier (V1), the other input of which is connected to the resistor bridge arm (RB1, RB2). The amplified bridge signal is supplied via the bandpass filter (BP1) to the phase-selective rectifier (PG), which is controlled on the other hand via a comparator (CP) with the carrier frequency by means of a switching transistor (T). A low pass filter circuit (TP) is connected downstream of the phase-controlled rectifier, which is embodied as a high pass filter stabilized feedback amplifier, the output signal (VS) of which is supplied to the evaluation processor and directly represents a bridge function of the capacitance ratio which must be transformed, by means of the bridge function equation and the function of the layered dielectric, into a relative amount of fill of the first measuring capacitor (C1). From this the grain flow must be determined by multiplication with the velocity value and then the bulk flow by means of the density value, which then must be transformed by means of integration into the total bulk which had flowed through in the respective integration time interval, FIG. 3 shows a further measuring circuit (M3) which, while being simply constructed, provides digitalization of the capacitance values of the two measuring capacitors (C1, C2).

The measuring electrodes are surrounded with protective rings which are connected to the impedance converter (NF). The reference electrodes of the measuring capacitors are connected with the input of the measuring circuit (M3) and are selectively controlled via a reversing switch (US1). This is supplied with amplifier (RV), the output of which leads to a comparator (W), the other input of which is supplied with a comparison voltage (UV).

At the input the evaluation processor (MP1) is connected with the output of a counter (CT), which is continuously charged by clock signals (CL) at the counter input. Each time the ramp voltage corresponds to the comparison voltage (UV), the output of the comparator (W) triggers an interrupt input (IR) of the evaluation processor (M1). As a consequence the latter triggers a discharge of the measuring capacitance via a quenching transistor (nS), placement of the reversing switch (US1) into the appropriate other position, transfer of the contents of the counter to an internal memory and re-setting of the counter (CT). When the comparison voltage (UV) is next attained, a further counter setting is transferred into another internal memory in the same way, after which the two respective counter settings, which directly correspond to the two capacitance values, are brought in a ratio to each other. The calculated ratio value is then further processed in accordance with the function of the layered dielectric and is then linked with the velocity value of the measuring signal (Sv) and the density value (SD), so that the respective bulk flow is obtained.

Figure 4:
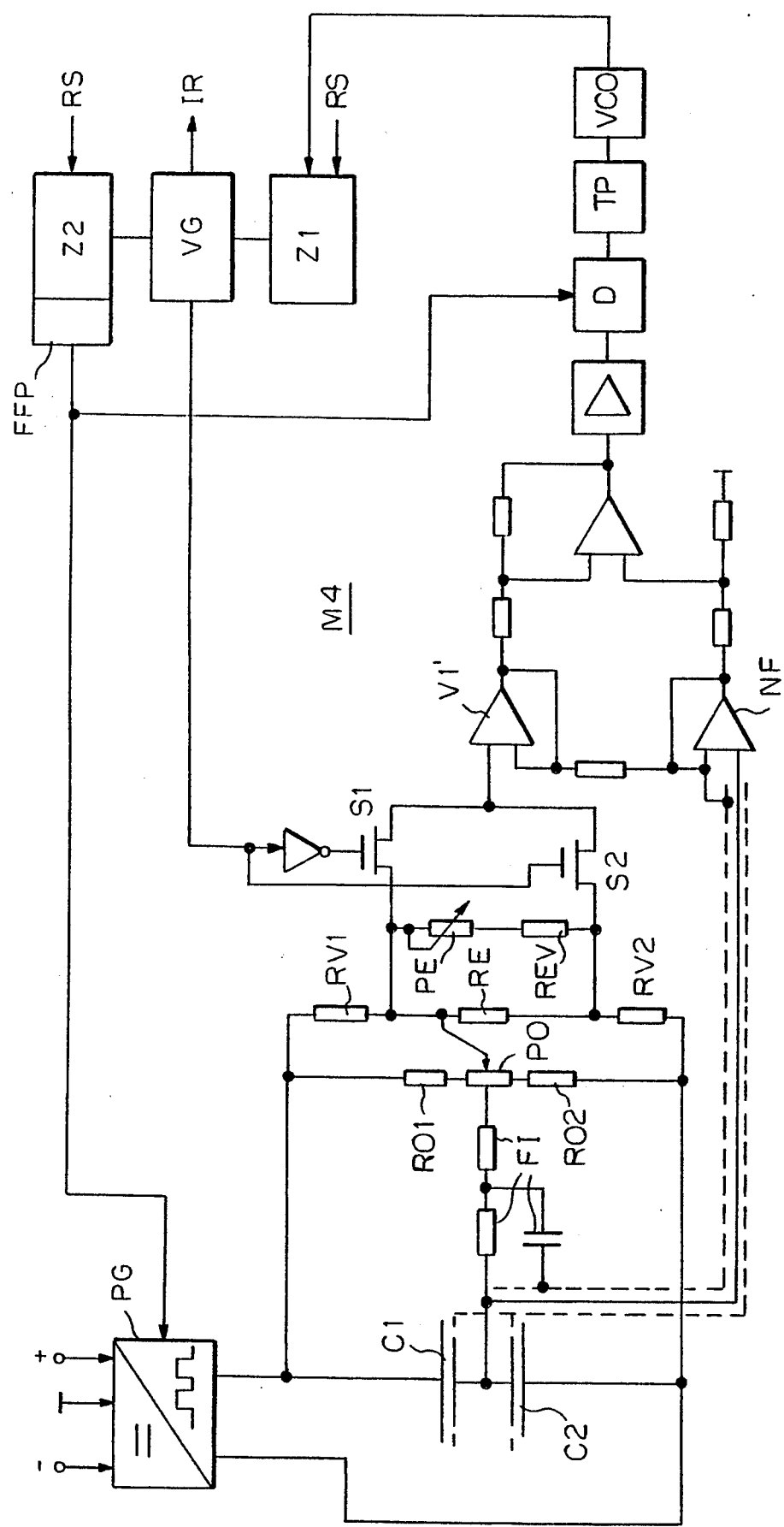
FIG. 4 shows a fourth measuring circuit with a bridge arrangement of the measuring capacitors.

FIG. 4 shows a further measuring circuit (M4) in which the measuring capacitors (C1, C2), together with a resistor network (R01, P0, R02; RV1, RE, RV2; PE, REV), are disposed in a bridge circuit which is supplied by a pulse generator (PG) which is controllable within the range of the pulse width ratio of the bridge circuit. The measuring electrodes of the measuring capacitors (C1, C2) are switched together and are enclosed by protective ring electrodes which are supplied with the potential of the measuring electrodes by the impedance converter (NF). The latter is furthermore connected with the resistance bridge point voltage overload of the bridge amplifier (V1') on account of leak currents is prevented. Because the potential divider base, the same as the shielding of the supply line to the measuring electrodes, follows the measuring electrode potential in respect to alternating current via the separating capacitor of the filter circuit, the effective load in the measuring diagonal of the bridge circuit because of this potential divider itself is negligibly small at very low absorption capacitances of a few picofarad.

The bridge potentiometer is used for the centerpoint equalization of the operating point of the amplifier circuit. The central resistor (RE) contained in the second resistor arm (RV1, RE, RV2) determines, in relation to the other two resistors, the operational range of the circuit in connection with the parallel potentiometer circuit (PE, REV), by means of which the range width can be set within limits.

The end points of the range resistor (RE) are connected via alternately open- or closed-loop controlled electronic switches (S1, S2) with the amplifier (V1'), to which on the other hand the signal of the measuring electrodes is supplied and the output signal of which triggers, via a demodulator (D) and a low pass filter (TP), a voltage-controlled oscillator (VCO), which triggers a first counter (Z1) of a timekeeping circuit into counting. A further counter (Z2) of the timekeeping circuit is continuously triggered into counting by a test frequency generator (FFP), which also controls the demodulator (D) and the pulse generator (PG). The two counter settings of the counters (Z1, Z2) are continuously compared in a comparator (VG), the output of which opens either one or the other switch (S1, S2), depending on the comparison result. With each reversal an interrupt signal (IR) is issued to the evaluating processor which then receives the counter settings the sequentially adopted counter settings in accordance with the bridge function and are then evaluated as described in connection with the other examples.

This type of a circuit makes possible a very high temporal resolution of oscillations in the grain flow, so that it is even possible during the passage of an elevator scoop to obtain a detailed flow profile by means of frequent measuring. A mean value is obtained from these measurement values by integration of the individual flow-through values over numerous scoop passages and then the mean value is displayed or further processed.

It is within the compass of expert skills to make combinations of the circuits shown according to their practicability.

Figure 5:
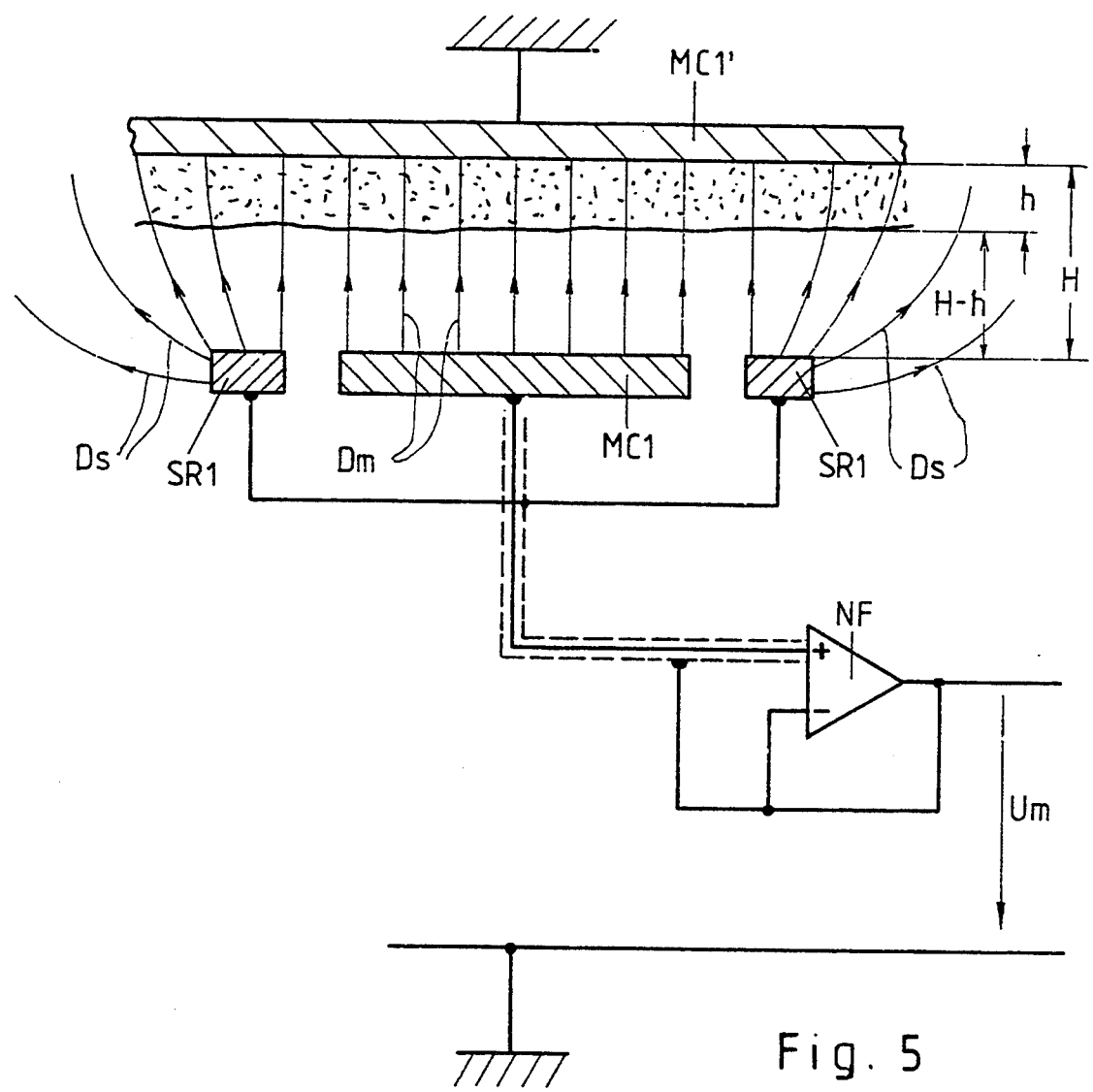
FIGS. 5 to 7 show further measuring capacitor devices.

In FIG. 5, which shows a detail of FIG. 1, a measuring section is built into the elevator head where, under the effect of centrifugal force, layering of the grain flow, the layer thickness of which is proportional to the flow, can be detected at the outer wall. The grain layer generated in this manner, together with the adjacent air layer, forms the layered dielectric of a plate capacitor consisting of the measuring electrode (MC1) provided with a protective ring (SR1) and of the reference electrode (MC1') connected to ground potential. With this arrangement and with an appropriate geometrical size of the width of the protective ring electrode and the measuring electrode (MC1), a mostly homogenous electrical field is formed in front of the latter which assures a highly defined, almost linear detection in accordance with electrical technology of the thickness of the layers of the grain flow. Making the assumption that the electrical field extends infinitely crosswise to the direction of flow of the grain, i.e. electrode walls would not constitute a limit of the potential laterally, the unavoidable non-homogeneities only form in front of in a very simple manner without problems from the capacitance detection by a potential follow-up by means of the impedance converter (NF). It has been advantageously provided that by means of the impedance converter (NF) the protective ring electrode (SR1) continuously and exactly follows up the measuring voltage (Um), up to an error voltage of maximally 1 $\mu$V provided at the measuring capacitor (MC1), in front of which a homogenous field distribution of the displacement current density lines (Dm) is present. It can further been seen in FIG. 5, that the non- homogenous displacement current density lines (Ds) remain without any relevant effects on the formation of the measuring voltage (Um).

Since the electrical force lines are strictly parallel to the displacement current density lines (Dm), a relative dielectric constant (Epsilon $_{rK}$) in accordance with the equations for layered dielectrics results for the two layers of the dielectric with the grain layer thickness (h) and the air layer thickness (H-h) and the associated averaged electrical field strengths (E) in accordance with the relationship $$\frac{E_{H-h}}{E_h} = \frac{\text{Epsilon}_K}{\text{Epsilon}_L} \text{ approximately equal to Epsilon}_{rK}$$

where the subscript K is used for grain and L for air. With this a capacitive determination of the height (h) of the grain layer is easily possible, because it is approximately exclusively determined by the relative dielectric constant of the grain.

Figure 6:
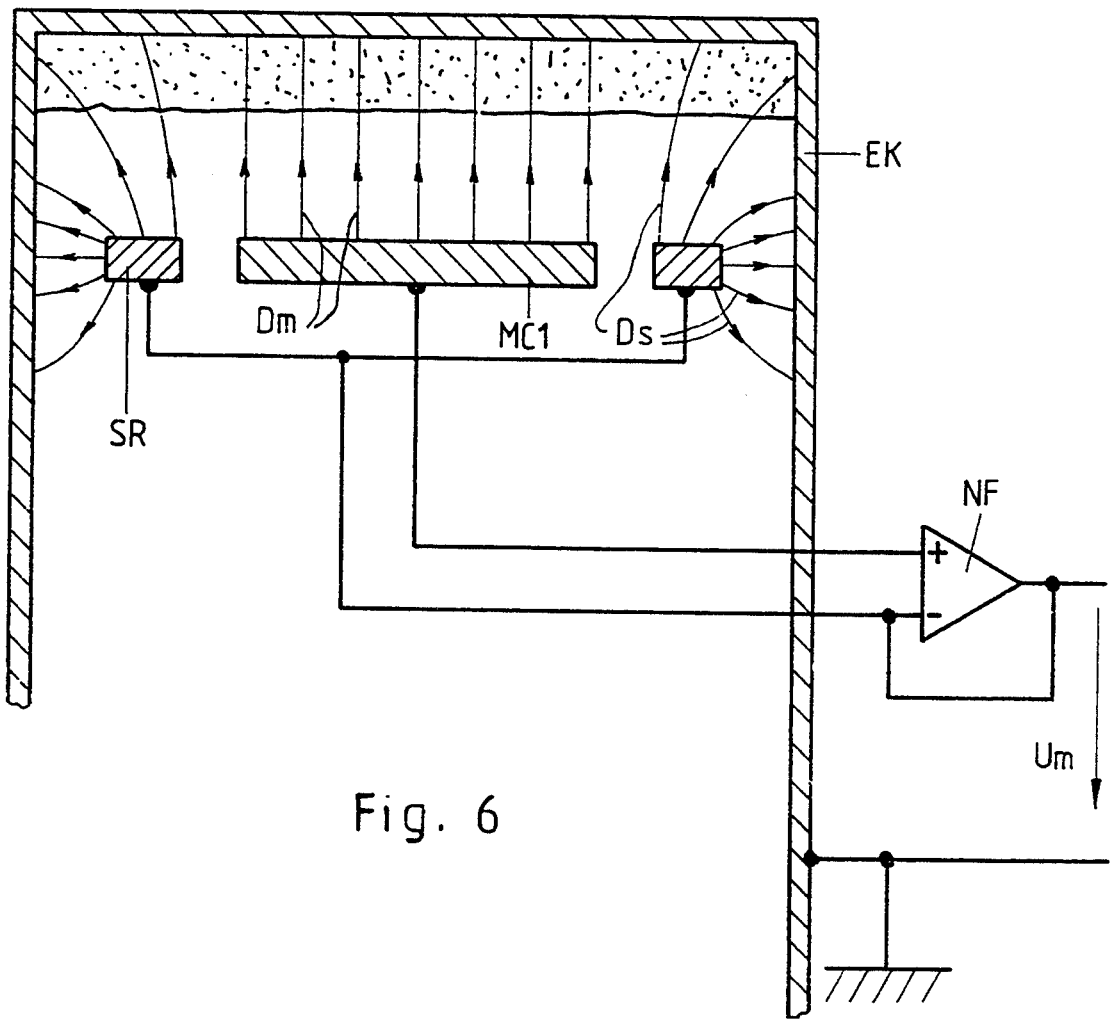

FIG. 6 shows a further arrangement of the measuring electrode (MC1), which takes into consideration the lateral limitation by means of a envelope (EK) connected to the ground lines (Dm, Ds) occurs here, which is qualitatively illustrated by their lines of force. It can be seen from this illustration that an approximately homogeneous field results in front of the measuring electrode even if the lateral field limitation consists of an envelope (EK) of the measuring chamber embodied in the approximate shape of a box. To this extent there is no basic difference between the devices in accordance with FIGS. 5 and FIG. 6, because here, too, the non-homogenous zones are removed from the capacitance detection by means of the impedance converter (NF) in connection with the protective ring electrode (SR).

Figure 7:
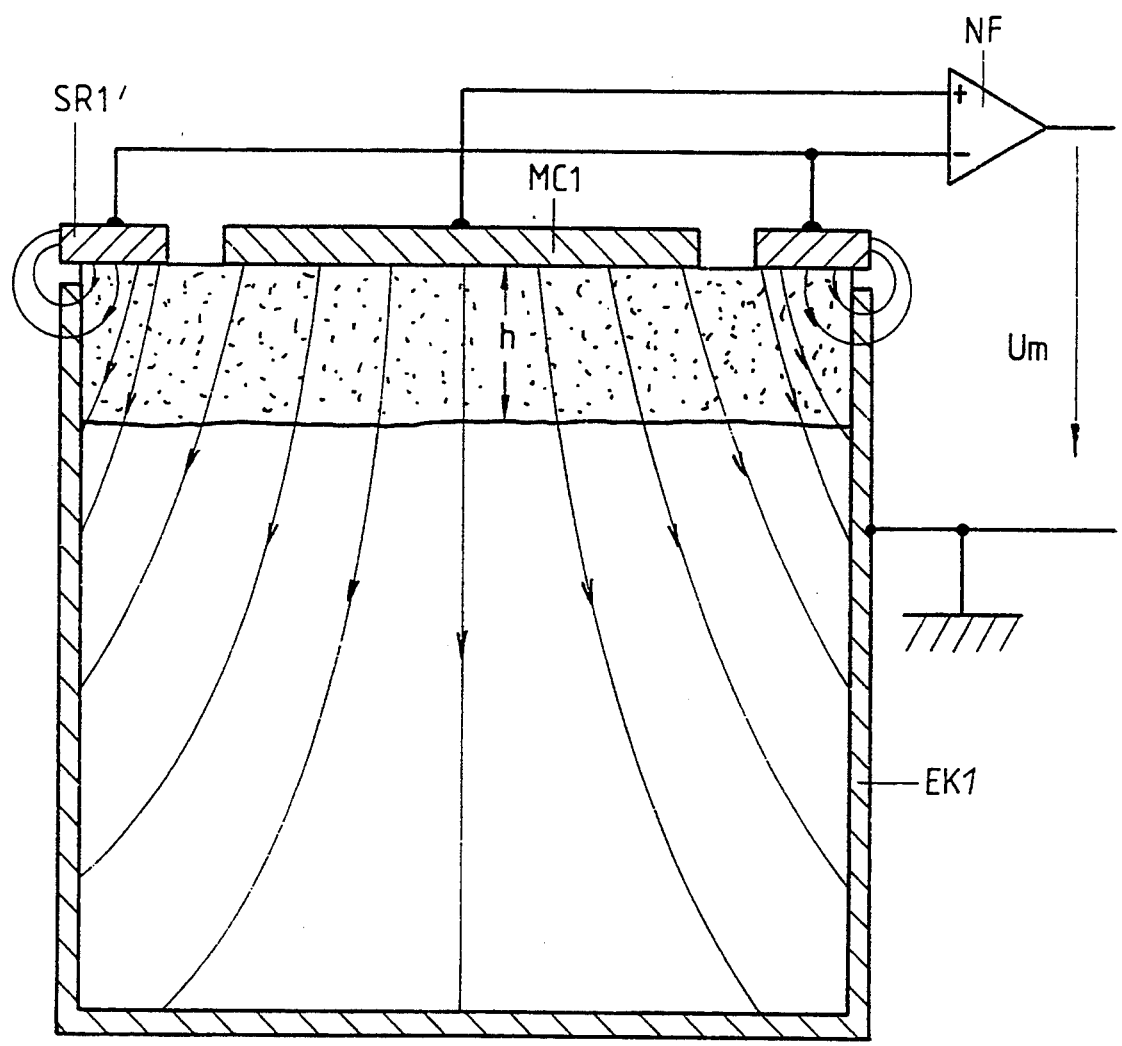

FIG. 7 shows a particularly advantageous measuring electrode arrangement. In this case the wall of the head has been directly replaced by the measuring electrode (MC1) and the laterally limiting protective ring electrodes (SR1) for the sake of simplification. A separate reference electrode can be omitted, because it is formed directly by the surrounding housing and elevator parts (EK1). Thus the elevator area is free of measuring components. As furthermore shown in FIG. 7, although the course of the displacement current density lines in front of the measuring electrode is not quite homogenous, but slightly curved, the essential curves of these lines of force are located in the air layer of the measuring section which adjoins the grain layer. The non-homogeneity of the field there has practically no effect on the measurement accuracy. The edge zones below the protective ring electrodes (SR1') are non-homogenous within the grain layer, just as in the other electrode arrangements in accordance with FIGS. 5 and 6; but the effect of the non-homogenous zones on the formation of the measuring voltage (Um) is completely eliminated with the aid of the impedance converter (NF) because of the voltage follow-up.

The approximately homogenous field distribution within the grain layer is provided directly under the measuring electrode (MC1). Practical tests have disclosed that, with suitable size of the width of the protective ring electrodes (SR1'), the surface of which facing the reference electrode corresponds, for example, to approximately ¼ to ½ of the active measuring electrode surface, the course of the characteristic curves from the measuring voltage (Um) above the thickness (h) of the grain layer almost completely agrees with the course of the characteristic curves in a device in accordance with FIG. 6. Only the measuring effect is less by a few percent, if the total device has equal dimensions.

The second measuring capacitor (C2) can also be disposed in a reservoir which is periodically emptied, in addition to placement in a constant partial bulk flow, if the bulk material has the same properties in respect to its capacitance over an appropriately long period of time. In connection with such an arrangement it must be determined by means of a pretest of the capacitance measurement value whether the measuring capacitor is already filled, i.e. that the reservoir is already partially filled in relation to the position of the measuring capacitor, since up to this time the capacitor has a fixed, previously known initial capacitance which is determined by the dielectric air. When comparing the capacitance with the measuring capacitor having the layered dielectric, the bulk flow is first, as long as the second measuring capacitor has not been filled yet, approximately determined taking into consideration empirical calibrated values of the capacitive properties of the respective bulk material. As soon as the measuring capacitor in the reservoir has been filled and the actual comparison value specific to the material of the capacitance is available, which is determined in each case by a comparison of the capacitive value regarding its temporally threshold value, the automatic consideration of the capacitive material properties takes place. In addition, the bulk values previously measured and approximately determined on the basis of experience which had been temporarily stored, are corrected in accordance with the measured capacity material coefficient.

In accordance with a calibration function, which gives the connection of the moisture content of the bulk material as a function of the measured capacitance, the measurement of the capacitance of the completely filled second capacitor is furthermore advantageously used to determine the respective moistness of the material to be measured and to report it by means of a display or printout. The relative composition of a differently composed mixture of two materials can be determined in the same way as the moistness of bulk material, if the dielectric constants of the two materials are different and the respective calibration curve of the capacitor in relation to the material mixtures is available. In this case there is a requirement that the mixture of the two materials is homogenous, because otherwise there is no clear functional relationship of the mixture ratio to the capacity. This measurement method can be used in harvesters for the evaluation of mixed grain harvested material.

Figure 8:
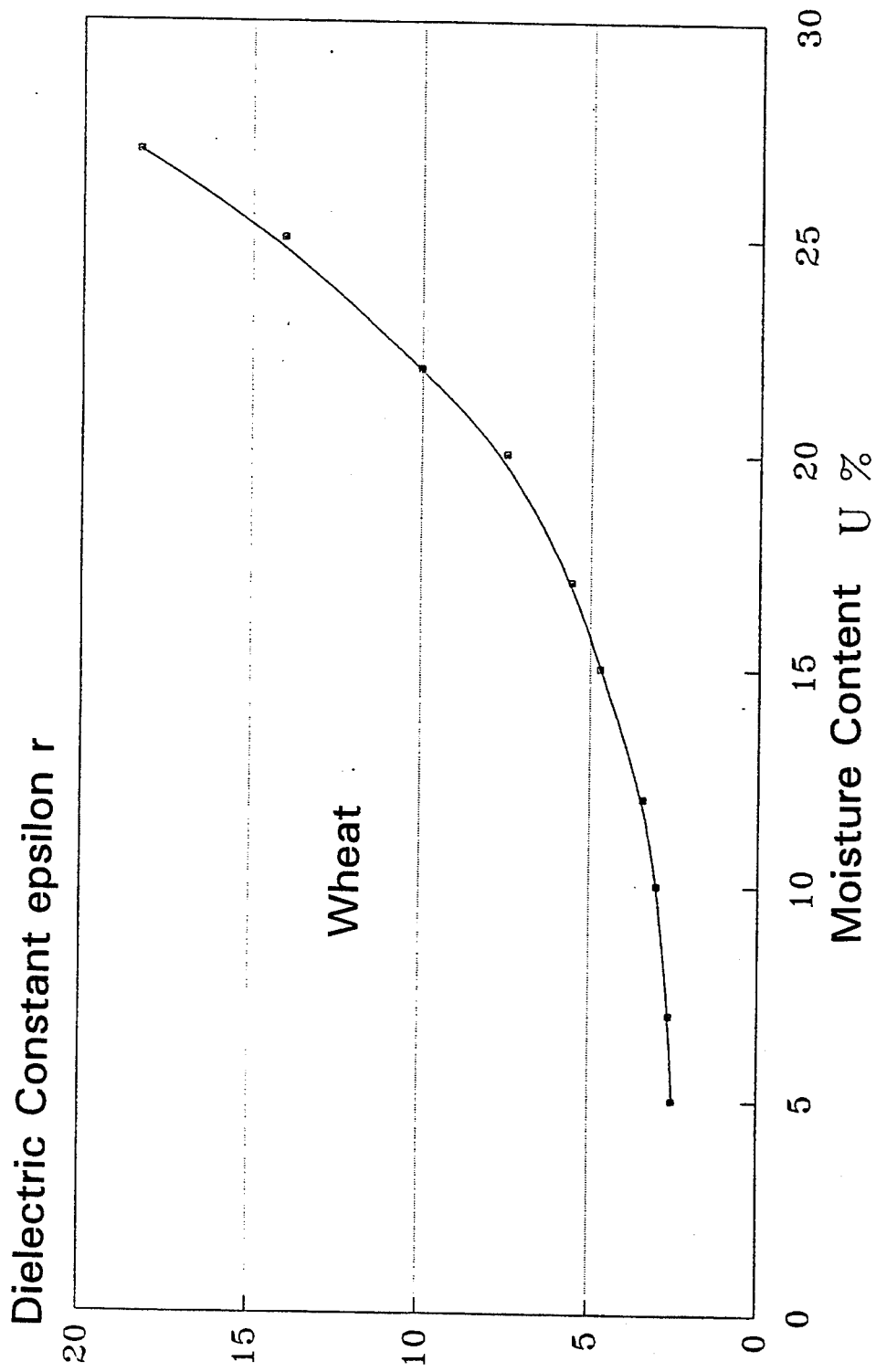
FIG. 8 shows the effects of the capacity, moisture, in wheat.

FIG. 8 shows the functional interrelation of the dielectric constant Epsilon as a function of the moisture content U in connection with wheat. Functional interrelationships of this type can be found in Kutzbach, Lehrbuch der Agrartechnik, Bd. 1, Allgemeine Grundlagen, Ackerschlepper, Fördertechnik [Textbook of Agricultural Technology, Vol. 1, General Basics, Farm Tractors, Materials-Handling Technology]. Corresponding functions of the interrelationship of the capacitance of the measuring capacitor with the properties or composition of the material can be determined for other materials. Conversion of the measured possibly interpolation between the stored values. In this way it is possible to determine by means of the illustrated function the moistness from the capacitance ratios, which are determined from the capacitance of the respectively filled capacitor and a one-time measurement of the capacitance of completely dry material of the same type.

Measuring devices in accordance with the invention can be placed into the main flow of harvested material as well as in side flows, for example of the incoming cut materials as well as in the straw flow.

Other harvesting machines besides combines, such as straw, grass or corn choppers or hay, straw or grass collectors, can be equipped with such a measuring device.

The second measuring capacitor, which is kept completely filled, can be advantageously designed as a cylinder capacitor, in which case only small areas of the edge with an non-homogenous field distribution occur.

To avoid falsification of the capacitance measurement by an ohmic line portion, the surfaces of the measuring electrodes and, if necessary, of the protective rings, are provided with an abrasion-resistant insulating covering.

The foregoing description of the specific embodiments will so fully reveal the general nature of the invention that others can, by applying current knowledge, readily modify and/or adapt for various applications such specific embodiments without departing from the generic concept, and therefore such adaptations and modifications are intended to be comprehended within the meaning and range of equivalents of the disclosed embodiments. It is to be understood that the phraseology or terminology herein is for the purpose of description and not of limitation.

What is claimed is:

1. A device for measuring a bulk flow of objects such as a grain material, having dielectric constants which are different from the surrounding medium, where the bulk flow is passed through a measuring capacitor, the capacitance of which is continuously measured, characterized in that the bulk flow is conducted through the measuring capacitor in a path in parallel with electrodes of the measuring capacitor by propulsion by centrifugal force of bulk flow objects so that the bulk flow objects form a layered dielectric with an approximately homogenous velocity distribution;

the bulk flow is deflected on a housing wall at the outlet of an elevator, so that it forms the velocity-homogenous, layered dielectric in the measuring capacitor disposed there;

the capacitor having coverings, one of the coverings being disposed at a distance from the bulk flow;

a covering of the capacitor of at least one of two measuring capacitors being enclosed with a protective ring electrode which is maintained by means of an impedance converter at the same potential as the enclosed capacitor covering so that the latter has an approximately homogenous electrical measuring field towards an other capacitor covering;

the layered dielectric has an air layer and a bulk flow layer;

the protective ring electrode and a measuring electrode enveloped by it are disposed on one side of the layered dielectric and a reference electrode is formed by an envelope on another side of the layered dielectric.

2. A device in accordance with claim 1, further characterized in that the bulk flow is conducted to a second measuring capacitor provided with an outlet of a through capacity which is smaller than a grain flow provided at the input thus leading to a continuous overflow, and that the two capacitances of the two measuring capacitors are determined with the same measuring device and that a capacitance ratio is formed form the two capacitance values, which is forwarded to a display for further processing.

3. A device in accordance with claim 2, further characterized in that the second measuring capacitor is disposed in a reservoir tank to which the bulk flow is directed.

4. A device in accordance with claim 3, characterized in that the second measuring capacitor (C2) consists of the parallel switching of a plurality of measuring capacitors which are disposed at different places within the bulk material reservoir.

5. A device in accordance with claim 3, further characterized in that the second measuring capacitor is a vertical cylinder capacitor which is open at an end.

6. A device in accordance with claim 1, further characterized in that the protective ring electrode and the measuring electrode enveloped by it are disposed on a side with said air layer of the layered dielectric and from an envelope at a side with said bulk flow layer and positioned in parallel with a reference electrode.

7. A device in accordance with claim 1, further characterized in that the protective ring electrode and the measuring electrode enveloped by it are disposed on a side with said bulk flow layer of the layered dielectric and that a reference electrode is formed by an envelope on a side with said air layer.

8. A device in accordance with claim 7, characterized in that the protective ring electrode (SR1') symmetrically covers at least ¼ of the boundary surface of the grain flow on the grain side laterally of the measuring electrode (MC1).

9. A device in accordance with claim 1, characterized in that two measuring capacitors (C1, C2) are alternately connected in a timed pattern via a controlled reversing switch (SU1) with a measuring device (M1), which consists of a bridge circuit (B1) supplied with a carrier frequency voltage (TF) and an output signal which is sequentially supplied via an amplifier (V1), a bandpass filter (BP1), a phase-selective rectifier (PG), a low pass filter (TP) and an analog-digital converter (ADU) to an evaluation processor (MP), which receives within the timed pattern the respective bridge signal value thus obtained and stores it assigned to the respectively selected measuring capacitor (C1, C2) and determines in accordance with a bridge function the capacitance assigned to the respective bridge signal value and establishes the capacitance ratio from their capacitances.

10. A device in accordance with claim 1, characterized in that two measuring capacitances (C1, C2) form an arm of a bridge circuit supplied with a frequency, the other arm of which consists of resistors (RB1, RB2) and the output signal of which is sequentially supplied in the form of a ratio signal (VS) via an amplifier (V1), a bandpass filter (BP1), a phase-selective rectifier (PG) and a low pass filter (TP) to an analog-digital converter of an evaluation processor, which directly represents 11. A device in accordance with claim 1, characterized in that two measuring capacitors (C1, C2) form a first arm of a pulse-controlled bridge circuit and that a resistor network (RO1, PO, RO2; RV1, RE, RV2; PE, REV) forms a second bridge arm and contains a range resistor (RE), the two ends of which are swtichably connected with the one input of a bridge amplifier (V1'), and the output of which is provided via a clock-controlled demodulator (D) and a low pass filter (TP) to a voltage-controlled oscillator (VCO), which triggers a first counter (Z1) of a timekeeping circuit, the contents of which are fixed-clock-controlled second counter (Z2) of a timekeeping circuit, the output of which causes an input reversal as well as the readout of the counter settings in an evaluation processor which determines the respective capacitance ratio from the respectively sequential counter settings while taking a bridge function into consideration.

12. A device in accordance with claim 1, further characterized in that the bulk flow is supplied to a measuring capacitor in such a way that it is filled to overflowing and a partial flow moves through it, and that the capacitance of the measuring capacitor is determined by a measuring device and linked with the capacitance-moisture content function or with a two-material-ratio-capacitance function, so that the moisture content of a ratio of two materials is detected, which then can be displayed.

13. A device in accordance with claim 1, further characterized in that at least one of measuring electrodes and the protective ring is coated with an abrasion-resistant electrical insulating layer on the side towards the bulk flow.

14. A device for measuring a bulk flow of objects such as a grain material, having dielectric constants which are different from the surrounding medium, where the bulk flow is passed through a measuring capacitor, the capacitance of which is continuously measured, characterized in that the bulk flow is conducted through the measuring capacitor in a path in parallel with electrodes of the measuring capacitor so that the bulk flow objects form a layered dielectric with an approximately homogenous velocity distribution;

two measuring capacitors are alternately connected via a controllable change-over switch with a current source and a ramp amplifier, downstream of which a threshold value discriminator is placed, the output signal of which, when the ramp amplifier signal has reached a preset threshold voltage, discharges directly or indirectly the respectively connected measuring capacitor via a discharging switch, puts the change-over switch into the respectively other position, transfers the respective contents of a time meter to a first memory of an evaluation processor and then resets the time meter, and that at the time the ramp amplifier signal has again attained the preset threshold voltage the respective contents of the time meter are transferred by the threshold value discriminator signal to a second memory of the evaluation processor including a second time meter and that then the capacitance ratio is formed from the contents of the two said time meters.

15. A device for measuring a bulk flow of objects such as a grain material, having a dielectric constants which are different from the surrounding medium, where the bulk flow is passed through a measuring capacitor, the capacitance of which is continuously measured, characterized in that the bulk flow is conducted through the measuring capacitor in a path in parallel with electrodes of the measuring capacitor so that the bulk flow objects form a layered dielectric with an approximately homogenous velocity distribution;

an evaluation processor links the capacitance ratio with a capacitance function of the layered dielectric defined by the total capacitance of the capacitor with a layered dielectric dependent on the relative height of one of the layers and by means of this determines the degree of fill of the first measuring capacitor defined by the relative height of grain material compared to the distance between electrodes of the measuring capacitor, that a velocity signal and a density signal are supplied to the evaluation processor, by which the respectively determined degree of fill is multiplied, because of which a respective bulk flow value is formed, and that the sequential bulk flow values are averaged over a plurality of measurements and are displayed.

16. A device in accordance with claim 15, further characterized in that the velocity signal is obtained from a tachometer at an elevator and is monitored by the evaluation processor in respect to maintaining a preset tolerance range and that, if it is exceeded, an alarm is triggered.

17. A device in accordance with claim 15, further characterized in that a second measuring capacitor is also a weighing cell connected with a weighing device, which emits the density signal.

18. A device in accordance with claim 15, further characterized in that a bridge signal function and the capacitance function of the layered dielectric are combined and are applied into one function and are together applied in this way to the bridge ratio value, to determine the degree of fill.

* * * * *